June 9, 1964  J. A. SMYSER  3,135,996
FLEXIBLE MOLD FOR TIRES
Filed Aug. 30, 1960  2 Sheets-Sheet 1

JAMES A. SMYSER
INVENTOR
HUEBNER & WORREL
ATTORNEYS
BY

June 9, 1964  J. A. SMYSER  3,135,996
FLEXIBLE MOLD FOR TIRES
Filed Aug. 30, 1960  2 Sheets-Sheet 2

JAMES A. SMYSER
INVENTOR
HUEBNER & WORREL
ATTORNEYS
BY

United States Patent Office 3,135,996
Patented June 9, 1964

3,135,996
FLEXIBLE MOLD FOR TIRES
James A. Smyser, 714 E St., Taft, Calif.
Filed Aug. 30, 1960, Ser. No. 52,858
11 Claims. (Cl. 18—18)

The present invention relates to a flexible mold for forming a tread in a tire casing and, more particularly, to such a mold wherein the tread receiving portion of the tire is forced against the tread forming wall of the mold by inflating the casing and wherein the mold accommodates diametric expansion of the casing outwardly against the mold by supporting the side walls and beads of the tire for resiliently flexible movement axially endwardly of the casing.

As is well known, the manufacture and retreading of tires includes the formation of a tread on the outer wall of the tire casing. In tire retreading, for example, the old casing is buffed smooth of its treads and then circumscribed by a so-called camelback, that is a tread-impressionable strip of rubber, which is bonded to the buffed casing.

Conventionally with tubeless tires, an annular inflatable, rubber bag is inserted in the tire casing with an internal surface thereof disposed radially inwardly of the casing. With tube-type tires, the regular inner tube or suitable substitute is employed. A rigid, diametrically adjustable, ring is fitted concentrically within the casing in circumferential engagement with the bag, or the inner tube, but free of the beads. This assembly is placed in a mold and the bag, or inner tube, is inflated to urge the camelback against the tread impressing portion of the mold. These known practices are expensive, laborious, and time consuming, particularly insofar as tubeless tires are concerned.

However, previous efforts to eliminate the bag and to press the camelback against the mold by direct inflation of the casing have been unsuccessful. In order to understand the reason for the prior failures, the problems involved must be recognized. While the mold must maintain a fixed inside diameter, the outside diameter of the tire casing obviously must increase. During such expansion by pumping air into the casing, the casing must be enclosed to prevent escape of air between the beads. The prior devices have been unsuccessful largely because in sealing the beads against air leakage, the side walls of the tire have been restricted from flexing to accommodate the required diametric expansion.

Accordingly, it is an object of the present invention to provide a resiliently flexible mold for confining a tire casing during manufacture, repair, recapping and the like.

Another object is to provide such a mold which is axially resilient but diametrically rigid.

Another object is to provide such a mold wherein the tread receiving portion of the tire is forced against the tread forming wall of the mold by inflating the casing and wherein the mold accommodates diametric expansion of the casing by supporting the side walls and the beads of the tire for resiliently flexible movement axially endwardly of the casing.

Another object is to provide a tire mold for tubeless tires which permits axial flexing or expansion of the side walls of the tire while maintaining substantial air-tight integrity so as to permit diametric expansion.

Another object is to minimize the time, expense, labor, and inconvenience in tire mold operations.

Another object is to eliminate the conventional bags and the problems incident thereto in manufacturing and retreading tires.

Another object is to maintain an air seal with the beads of a tire casing while permitting the flexing of the side walls and beads to accommodate diametric expansion of the tire casing incident to inflation thereof during manufacturing and retreading tires.

Another object is to provide a flexible mold which accommodates various sizes of tires.

Another object is to provide a flexible tread forming mold adapted for, but not restricted to, installation in a conventional press or clam-shell type apparatus.

Other objects are to provide a flexible mold of the type described which is durable in construction, dependable in action, and highly effective for accomplishing its intended purposes.

These, together with other objects, will become more fully apparent upon reference to the following description and accompanying drawings.

Figures 1, 2:
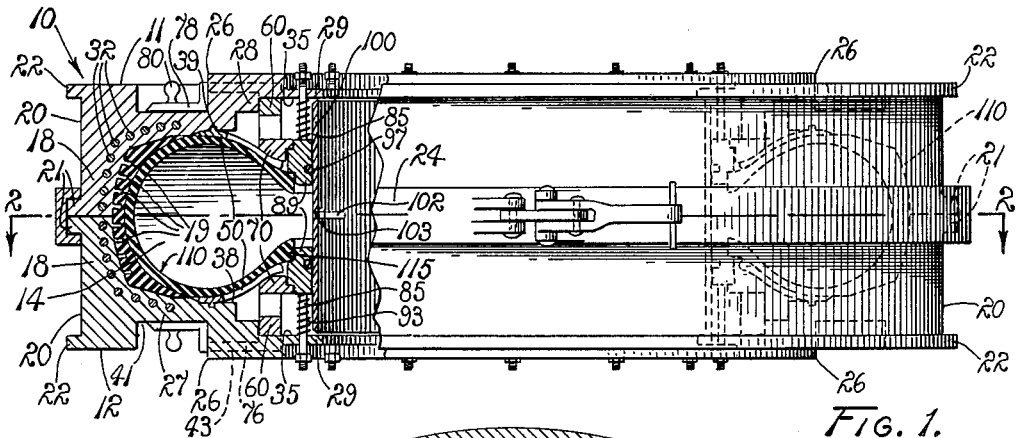
FIG. 1 is a side elevation of a mold embodying the principles of the present invention with portions thereof in section and broken away to show the construction of internal portions of the mold and with an inflated tire casing positioned in the mold.
FIG. 2 is a diametric section taken on a plane at a position represented by line 2—2 of FIG. 1 but with the tire casing removed.

Referring more particularly to the accompanying drawings, the mold of the subject invention includes an annular matrix body 10 having identical opposed, releasably interconnected, upper and lower, sections 11 and 12, respectively, and defining a generally doughnut-shaped or torus cavity 14 concentric to a predetermined axis of reference. It is to be understood that the matrix body is operable in any attitude desired but for convenience of description, it is illustrated in a horizintal position. Therefore, the sections are referred to as being upper and lower and said predetermined axis as being vertical.

Inasmuch as both the upper and lower sections 11 and 12 of the body are of identical construction, only one is described in detail. The lower section, therefore, includes an axially extended, outer, tread forming wall 18 providing a plurality of annular, radially inwardly extended blades 19. This outer wall has an outwardly disposed, annular recess 20 between a central rim 21 and an end rim 22, both of which circumscribe the wall. Parenthetically, it is to be noted that an adjustable clamp 24, releasably circumscribes the upper and lower sections of the body in clamping engagement with the mating central rims of the sections.

Figures 3, 4:
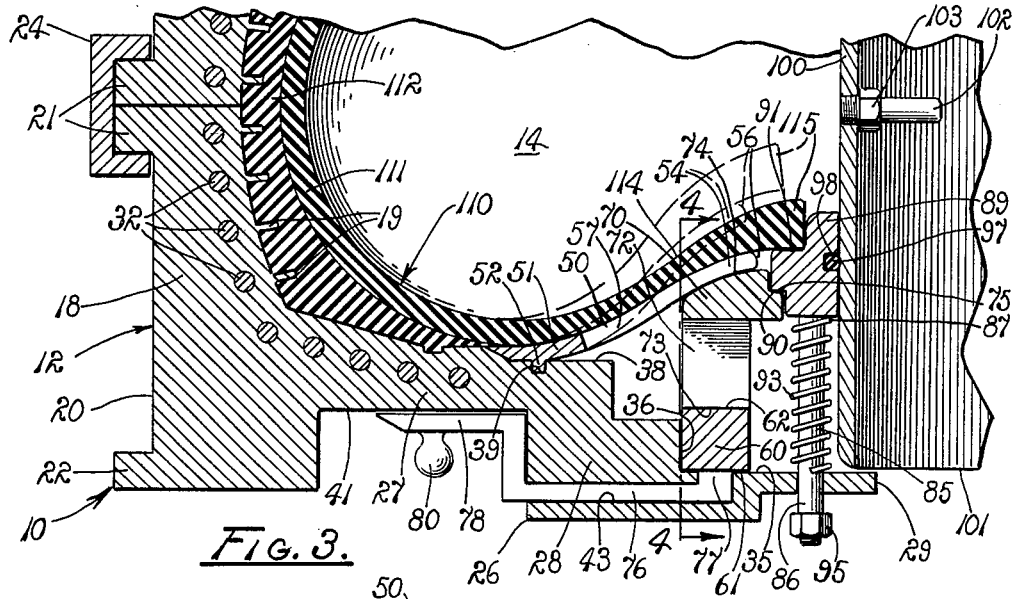
FIG. 3 is a somewhat enlarged, fragmentary, radial section taken on a plane at a position represented by line 3—3 in FIG. 2 and showing the tire casing in deflated condition and an annular supporting plate in relaxed position in dashed lines.
FIG. 4 is a fragmentary section taken on a plane at a position represented by line 4—4 in FIG. 3.

The body 10 also includes a side wall 26 inwardly extended from the outer wall 18 in generally oblique relation to said predetermined axis of reference. That is, the side wall extends both inwardly and radially of the outer wall. The side wall has an outer portion 27 which is integral with the outer wall and an inner portion integrally inwardly extended from the outer portion and terminating in an annular inner edge 29. It is to be noted that the inner edge of the side wall is substantially in the same plane as the end rim 22 and that this inner edge is axially endwardly spaced from the juncture of the side wall with the outer wall, as best seen in FIGS. 1 and 3. While not forming any part of the present invention, a plurality of heating elements 32 are embedded in the outer and side walls of the body 10.

The inner portion 28 of the side wall 26 has a flat, annular, radially extended, cam supporting surface 35 terminating oppositely from the inner edge 29 in an axially extended, annular shoulder 36. The inner portion also has a substantially flat, annular plate supporting surface 38 axially inwardly spaced from the cam supporting surface and also radially outwardly displaced therefrom. The plate supporting surface has an annular groove 39 therein. The outer portion 27 of the side wall has an outwardly disposed channel 41, and the inner portion provides an elongated, arcuate slot 43 opening into the cavity 14 through the cam supporting surface.

An annular, tire supporting plate 50, having an elongated S-shaped or ogee cross-section, provides an arcuate outer portion 51 having a downwardly disposed convex surface rested on the plate supporting surface 38 of the lower section 12 and an annular, downwardly extended tongue 52 releasably fitted in the groove 39 in this surface. Preferably, as best illustrated in FIG. 3, the outer portion of the plate has an outwardly extended, feathered edge complementarily mating with a corresponding oblique surface of the side wall. The tire supporting plate also has an upwardly, smoothly arcuate, resiliently flexible inner portion 54 terminating in an inner edge 56 and being provided with a plurality of circumferentially spaced, elongated slits 57 generally radially outwardly extended from said inner edge of the plate. The inner portion is fulcrumed on the outer portion so that when weight or pressure is imposed against the outer portion of the plate holding it against the supporting surface 38, the inner portion of the plate is held in upwardly extended position. However, the slits permit this inner portion to move resiliently downwardly when pressure is imposed downwardly thereagainst. Of course, upon relief of pressure against the inner portion causing such flexing, the inner portion returns upwardly into the initially described position.

With particular reference to FIGS. 3 and 4, an annular camming ring 60 concentrically circumscribes the axis of the matrix body 10 and has a mounted edge 61 slidably rested on the cam supporting surface 35. The ring has an upper serrated camming edge 62 including a plurality of circumferentially spaced, inclined ramps 63 having upper peaks 65 and lower valleys 66. Adjacent ramps are joined by axially extended shoulders 67 interconnecting the valley of one ramp to the peak of the next successive ramp.

An annular plate supporting ring 70 concentrically circumscribes the axis of the body 10 and has a plurality of axially extended, circumferentially spaced, downwardly extended cam following legs 72 having lower beveled edges 73 individually, complementarily, slidably engaging the ramps 63. The plate supportnig ring has an upper convex plate supporting surface 74 and an inner, radial ledge 75. An elongated handle 76 is slidably received in the slot 43 for movement in a path concentric to said predetermined axis of the body and includes an inner end 77 rigidly connected to the camming ring 60 and an outer end 78 disposed in the channel 41. A knob 80 is connected to the outer end of the handle for facilitating manual control of the handle.

A plurality of elongated, collar mounting rods 85 provide mounting ends 86 axially slidably extended through the inner portion 28 of the side wall 26 and relatively adjacent to the inner edge 29 thereof. The rods are spaced circumferentially about the inner portion of the side wall and have inner ends 87. An annular, bead engaging collar 89 is rigidly secured to the inner ends of the rods in concentric circumscribing relation to the axis of the body 10 and provides an outer radial shoulder 90 engageable with the ledge 75 on the plate supporting ring 70. The collar also has an annular, upwardly disposed radial ledge 91. Coiled compression springs 93 individually circumscribe the rods and have opposite ends bearing against the inner portion of the side wall and the collar for yieldably urging the collar axially inwardly of the matrix body. Nuts 95 are respectively screw-threaded on the mounting ends of the rods on the opposite side of the side wall from the collar thereby to limit inward axial movement of the collar. An annular O-ring 97 is disposed in a notch 98 in collar.

An elongated cylindrical sleeve 100 is concentrically positioned with the matrix body 10 with its outer surface axially slidably engaged by the collar 89 and with the O-ring 97 in axial slidable, air-tight engagement therewith. The sleeve has opposite end edges 101 adjacent to the inner edges 29 of the side walls 26. An air supply conduit 102 is radially extended through the sleeve between the collars 89 on the upper and lower sections 11 and 12 and is held in position by a jamb nut 103.

*Operation*

The operation of the described embodiment of the subject invention is briefly summarized at this point. In considering the operation of this invention, reference is conveniently made to an annular, rubber tire casing 110, of conventional construction, including an outer wall 111 to which is bonded a tread receiving camelback 112 and a pair of flexible side walls 114 radially inwardly extended from the outer wall and terminating in annular beads 115.

In forming treads in the camelback 112 of the tire casing 110, the upper and lower sections 11 and 12 of the matrix body 10 are separated by releasing the clamp 24 and lifting the upper section off of the lower section. It is to be noted that the mold of the subject invention can be incorporated in conventional press or clam shell types of apparatus. However, for the purpose of the present invention, it is assumed that the body is rested in a horizontal position on any convenient support, not shown. It is also to be understood that the apparatus operates in any attitude although it is most commonly employed in a horizontal position. With the camelback applied to the outer wall 111, the tire casing is positioned in the cavity 14 with the camelback engaging the tread forming outer wall 18 and the downwardly disposed side wall 114 of the tire casing rested on the side wall 26 of the lower section 12. More specifically, the downwardly disposed side wall of the tire casing engages the outer portion 27 of the side wall of the matrix body and extends inwardly in overlying relation to the tire supporting plate 50. The downwardly disposed bead 115 is axially upwardly spaced from the inner edge 29 of the side wall of the body and is rested on the shoulder 91 of the collar 89.

Thereafter, the sleeve 100 and the upper section 11 of the matrix body 10 are successively positioned in their above described assembled relation with the lower section 12, and the clamp 24 is extended about the upper and lower sections in clamping relation thereto. It is to be noted that the upper tire supporting plate 50 and collar 89 are respectively in engagement with the upwardly disposed side wall 114 and bead 115 of the tire casing 110. During such assembly, the ledge 75 and shoulder 90 of the upper supporting ring 70 and collar 89 abut to retain the supporting ring in the upper section.

With the heating elements 32 energized in a manner well known in the art, air under pressure is pumped into the cavity 14 through the conduit 102. This expands the tire casing 110 whereby the camelback 112 is forced radially outwardly against the outer wall 18 of the matrix body 10 thereby to impress the heated camelback with the blades 19 and to form a tread in the camelback.

During such expansion, the upper and lower, flexible tire supporting plates 50 yield respectively upwardly and downwardly thereby to provide continuous support for the side walls 114 of the tire casing. Further, the beads 115 are urged tightly against their respective collars 89 during the expansion of the tire casing thereby to seal the beads to the collars in substantially air-tight engagement and to preclude any significant leakage of air therebetween. Of course, the collars move axially endwardly along the sleeve 100 incident to outward expansion of the beads. Inasmuch as the collars are in air-tight engagement with the sleeve, there is no leakage through these paths and expansion of the tire casing is readily effective.

Mounting the side walls 114 of the tire casing 110 for resilient floating movement allows the outer wall 111 and camelback 112 to expand diametrically outwardly. That is, outward flexing of the side walls of the tire casing, while maintaining an air-tight seal with the collars and sleeve 89 and 100, accommodates said diametric expansion of the camelback and the outer wall. When the tread has been formed, air pressure is relieved in the conduit 102 and the side walls 114 and the inner portions 54 of the tire supporting plates 50 resiliently return to their relatively convergent relaxed positions. Also, the springs 93 urge the collars axially inwardly on the sleeve 100 into their innermost positions relatively adjacent to each other.

It is to be noted that outward expansion of the inner portions 54 of the tire supporting plates 50 is limited by engagement of the inner plate portions with their respective plate supporting rings 70. The axial positions of the plate supporting rings are adjusted by their corresponding camming rings 60, that is, the handles 76 are moved in the slots in one direction or the other circumferentially of the axis of the mold thereby to urge the plate supporting rings axially inwardly or permit their movement outwardly, as during tire expansion. More specifically, as the lower camming ring is moved toward the right, as illustrated in FIG. 4, the lower plate supporting ring is urged axially inwardly since the cam following legs 72 ride upwardly along the ramp 63. The collars are also limited in their axial outward movement by engagement with the ledges 75 on the plate supporting rings 70.

After the air pressure has been turned off in the conduit 102 and pressure is released from the casing, the clamp 24 is disconnected and the upper section 11 and the sleeve 100 are removed to allow the treaded tire casing 110 to be removed from the cavity 14. The parts of the subject mold are thus readily assembled and disassembled in a convenient and rapid manner.

From the foregoing, it will be evident that a resiliently flexible mold for forming treads on a tire casing and for recapping tires has been provided. The subject mold allows the treads to be formed and camelbacks to be secured in place by inflation of the tire casings and accommodates such inflation and diametric expansion of the casings by supporting the side walls and beads of the tire casings for resiliently flexible movement axially endwardly of the casings. The mold obviates the need for and the inconveniences and expenses caused by the conventional bag employed with treading and retreading tubeless tires according to conventional methods.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A mold for impressing a tread on a tire casing having a tread receiving portion and a pair of side wall portions outwardly extended from said tread portion and terminating in annular beads, comprising a substantially cylindrical sleeve; an annular matrix body concentrically circumscribing the sleeve including opposed, substantially identical, matrix sections defining a cavity therebetween and providing inner annular edges circumferentially adjacent to said sleeve, side walls convergently outwardly extended with respect to each other from their respective inner edges, and releasably interconnected tread forming walls generally axially extended toward each other from their respective side walls and in radially outwardly spaced relation from said inner edges, the cavity being adapted to receive such a tire casing in circumscribing relation to the sleeve with the tread portion in opposed relation to said tread forming walls, with the side wall portions divergently inwardly extended relative to said side walls, and with said beads inwardly axially spaced from the inner edges of the body; annular plates of resiliently flexible material individually engaging the side walls of the body in opposed relation to each other and in circumscribing relation to the sleeve having inner radially slit portions extended inwardly of the body in divergently spaced relation to their respective side walls and adapted to be engaged by the side wall portions of the casing incident to outward expansion thereof; collars axially slidably circumscribing the sleeve in axially spaced relation to each other for individual engagement with the beads of the casing; resilient means interposed the collars and their respectively adjacent inner edges of the body for yieldably urging the collars relatively inwardly toward each other; and air conducting means extended through the sleeve between the collars and in communication with the cavity of the matrix body for inflating the tire casing and urging the side wall portions and beads thereof into engagement with said collars and said resiliently flexible plates.

2. The mold of claim 1 including annular supporting rings concentrically circumscribing the sleeve in circumferentially spaced relation thereto and individually interposed the respectively adjacent plates and side walls; camming rings concentrically circumscribing the sleeve in circumferentially spaced relation thereto and individually rotatably slidably engaging the inner portions of the sidewalls of the mold axially endwardly of the respective supporting rings, the camming rings providing a plurality of successive ramps disposed toward the supporting rings and in oblique angular relation to a plane normal to the common axis of the sleeve and the matrix body, the supporting rings including a plurality of cam following legs axially endwardly extended from the supporting rings and individually slidably engaging the ramps of their respective camming rings; and including means connected to the camming rings and extended outwardly of the body for individually rotatably adjusting the camming rings relative to the side walls of the body for urging the supporting rings axially inwardly toward their respective plates and for allowing such supporting rings to move axially endwardly incident to outward expansion of the side plates.

3. In a mold for tire casings having circumscribing tread portions and side walls inwardly convergently extended from the tread portions and terminating in axially spaced annular beads, a pair of resiliently flexible annular mold side walls having outer and inner peripheries adapted to receive such a casing therebetween in engagement with the side walls of the casing, means mounting the outer peripheries of the mold side walls in predetermined parallel spaced relation with the inner peripheries being manually movable toward each other and freely movable within predetermined limits from each other incident to expansion of the casing, means supporting the inner peripheries of the casing side walls and engageable with the beads of such a casing movable with the mold side walls toward and from each other to accommodate movement of the beads toward and from each other while constraining the beads to a cylindrical plane concentric to the side walls, and means for expanding such casings between said side walls.

4. A tire mold, for tire casings having circumscribing tread portions and side walls inwardly convergently extended from the tread portions terminating in axially spaced annular beads, comprising a rigid matrix having an inwardly disposed cavity adapted to receive the tread portion of such a tire casing having side walls which marginally extend inwardly over the outer portions of the side walls of such a casing and terminate in outwardly spaced relation to the beads thereof to permit axial flexing of the side walls of the casing toward and from each other, annular means of fixed diameter mounted concentrically of the matrix engageable within the beads of such a casing adapted to accommodate axial movement of the beads toward and from each other incident to flexing of the side walls of such a casing whereby upon movement of the beads away from each other the side walls of the casing are thrust toward the matrix and upon movement of the beads toward each other the side walls are drawn from the matrix, resiliently flexible annular means mounted on the matrix concentrically between said side walls of the matrix and the annular means of fixed diameter to support said side walls of the casing adjacent to the beads thereof during said axial movement of the beads, and means for expanding such a casing within the matrix.

5. A tire mold, for tire casings having circumscribing tread portions and side walls inwardly convergently extended from the tread portions terminating in axially spaced annular beads, comprising a rigid matrix having an inwardly disposed cavity adapted to receive the tread portion of such a tire casing and having side walls on opposite sides of the cavity which marginally extend inwardly over the outer portions of the side walls of such a casing and terminate in outwardly spaced relation to the beads thereof to permit axial flexing of the side walls of the casing toward and from each other, annular means of fixed diameter mounted concentrically of the matrix engageable within the beads of such a casing adapted to accommodate axial movement of the beads toward and from each other incident to flexing of the side walls of such a casing while constraining the beads to movement in a cylindrical plane in uniform spaced relation to the matrix whereby upon movement of the beads away and from each other the side walls of the casing are thrust toward the matrix and upon movement of the beads toward each other the side walls are drawn from the matrix, an annular axially flexible plate mounted on each of the side walls of the matrix and inwardly convergently extended therefrom in overlying relation to said annular means for engagement with the side walls of the casing, and means for expanding the casing within the matrix.

6. A tire mold, for tire casings having circumscribing tread portions and side walls inwardly convergently extended from the tread portions terminating in axially spaced annular beads, comprising a matrix having a mold cavity adapted to receive the tread portion of such a tire casing marginally extended inwardly over the outer portions of the side walls thereof and terminating in circular inner edges in outwardly spaced relation to the beads of such a casing, resiliently flexible side plates mounted on each of said inner edges of the matrix having inwardly disposed surfaces continuous with the walls of the cavity adapted to engage the side walls of the casing, said side plates extending convergently toward the beads of the casing, means for inflating the casing to expand the casing into the matrix and to urge the beads apart, adjustable annular means of fixed diameter engageable with the side plates and with the beads to limit movement of the beads apart, and control means mounted on said annular means extended outwardly of the matrix for setting the beads in predetermined position.

7. A tire mold, for tire casings having circumscribing tread portions and side walls inwardly convergently extended from the tread portions terminating in axially spaced annular beads, comprising a rigid matrix having an inwardly disposed cavity adapted to receive the tread portion of such a tire casing and having side walls on opposite sides of the cavity which marginally extend inwardly over the outer portions of the side walls of such a casing and terminate in outwardly spaced relation to the beads thereof to permit axial flexing of the side walls in the casing toward and from each other, a pair of annular members of fixed diameter mounted concentrically of the matrix for movement toward and from each other engageable with the beads of such a casing adapted to accommodate axial movement of the beads toward and from each other incident to flexing of the side walls of such a casing while constraining the beads to movement in a cylindrical plane in uniform spaced relation to the matrix whereby upon movement of the beads away from each other the side walls of the casing are thrust toward the matrix and upon movement of the beads toward each other the side walls are drawn from the matrix, an annular axially flexible plate rigidly mounted on each of the side walls of the matrix and inwardly convergently extended therefrom having inner surfaces continuous with the inner surfaces of the cavity for engagement with the side walls of the casing, annular means mounted concentrically of the matrix outwardly against each of the bead engaging members adjustably positioned to limit movement of the bead engaging members from each other, and means for expanding such a casing within the matrix.

8. An adjustable mold, for tire casings having circumscribing tread portions and side walls inwardly extended from the tread portions terminating in axially spaced annular beads, which casings are of substantially uniform diameter measured diametrically of the beads but have varied circumferences measured in axial planes radial thereto, comprising a partial cavity matrix having a rigid continuous annular periphery adapted to receive the tread portions of such casings, resiliently flexible side plates mounted on the matrix on opposite sides of the cavity convergently extended inwardly therefrom adapted to overlay the side walls of casings received therein to positions adjacent to the beads thereof, said plates being pivotal toward and from each other, a pair of annular members of fixed diameter adapted individually internally to engage the beads of such casings, means mounting the annular members for movement axially of the matrix member in concentric relation to the periphery of the matrix member, means for inflating the tire casings within the cavity of the matrix member whereby the beads are forced apart spreading the annular members to force the casing into the rigid periphery of the matrix member while pivoting the side plates outwardly, and adjustable stop means engageable with the side plates and the annular members to limit outward movement of the plates and annular members to accommodate predetermined casing sizes.

9. An adjustable mold, for tire casings having circumscribing tread portions and side walls inwardly extended from the tread portions terminating in axially spaced annular beads wherein successive casings have varied peripheral dimensions measured between the beads externally of the casing, comprising a matrix having a rigid continuous annular periphery adapted to receive the tread portions of such casings, resiliently flexible annular side plates having outer edges pivotally engaging said matrix member and inner edges providing a plurality of circumferentially spaced slits radially outwardly extended therefrom, a pair of annular bead engaging members supporting said inner edges of the plates for movement axially of the matrix member in concentric relation to the periphery of the matrix member, a sleeve adapted to bridge between the spaced beads of the casing in air-tight sealing relation to said bead engaging members during said axial movement thereof, means for inflating the tire casings with the cavity of the matrix member whereby the beads are forced apart spreading the bead engaging members to pivot the annular plates relative to the matrix member for forcing the casing into the rigid periphery of the matrix member, and an adjustable stop controllable externally of the mold engageable with the side plates and the annular bead engaging members to limit outward movement of the plates and annular members to a predetermined position so as to establish the optimum mold cavity contour for particular tire sizes.

10. A tire mold, for tire casings having circumscribing tread portions and side walls inwardly convergently extended from the tread portions terminating in axially spaced annular beads, comprising a rigid matrix having an inwardly disposed cavity adapted to receive the tread portion of such a tire casing and having rigid side walls on opposite sides of the cavity which marginally extend inwardly over the outer portions of the side walls of such a casing and terminate in outwardly spaced relation to the beads thereof to permit axial flexing of the side walls of the casing toward and from each other, a pair of annular members of fixed diameter mounted concentrically of the matrix for movement toward and from each other engageable within the beads of such a casing adapted to accommodate axial movement of the beads toward and from each other incident to flexing of the side walls of such a casing while constraining the beads to movement in a cylindrical plane in uniform spaced relation to the matrix whereby upon movement of the beads away from each other the side walls of the casing are thrust toward the matrix and upon movement of the beads toward each other the side walls are drawn from the matrix, an annular axially flexible plate rigidly mounted on each of the side walls of the matrix and inwardly convergently extended therefrom having inner surfaces continuous with the inner surfaces of the cavity for engagement with the side walls of the casing, annular means mounted concentrically of the matrix endwardly against each of the bead engaging members and the adjacent side walls of the mold for adjustable movement toward and from each other, adjustable stop means engageable with said annular means to limit movement thereof from each other, and means for inflating such a casing within the matrix.

11. A tire mold, for tire casings having circumscribing tread portions and side walls inwardly convergently extended from the tread portions terminating in axially spaced annular beads, comprising a rigid matrix having an inwardly disposed cavity adapted to receive the tread portion of such a tire casing and having rigid side walls on opposite sides of the cavity which marginally extend inwardly over the outer portions of the side walls of such a casing and terminate in outwardly spaced relation to the beads thereof to permit axial flexing of the side walls of the casing toward and from each other, a pair of annular members of fixed diameter mounted concentrically of the matrix for movement toward and from each other engageable within the beads of such a casing adapted to accommodate axial movement of the beads toward and from each other incident to flexing of the side walls of such a casing while constraining the beads to movement in a cylindrical plane in uniform spaced relation to the matrix whereby upon movement of the beads away from each other the side walls of the casing are thrust toward the matrix and upon movement of the beads toward each other the side walls are drawn from the matrix, an annular axially flexible plate rigidly mounted on each of the side walls of the matrix and inwardly convergently extended therefrom having inner surfaces continuous with the inner surfaces of the cavity for engagement with the side walls of the casing, annular means mounted concentrically of matrix outwardly against each of the bead engaging members adjustably positioned to limit movement of the bead engaging members from each other, resiliently compressible means engaged against said annular means urging the annular means, the bead engaging members and the beads toward each other, and means for inflating such a casing within the matrix.

References Cited in the file of this patent

UNITED STATES PATENTS

| | | |
|---|---|---|
| 1,276,592 | Swinehart | Aug. 20, 1918 |
| 2,152,755 | Barnes | Apr. 4, 1939 |
| 2,418,584 | Hawkinson | Apr. 8, 1947 |
| 2,835,921 | White | May 27, 1958 |
| 2,854,692 | Robbins | Oct. 7, 1958 |
| 2,866,228 | French | Dec. 30, 1958 |